(12) United States Patent
Chen

(10) Patent No.: US 9,213,133 B2
(45) Date of Patent: Dec. 15, 2015

(54) LED TUBE WITH LIGHT GUIDING PLATE ARRANGED IN A TRIANGLE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 65 days.

(21) Appl. No.: 14/085,808

(22) Filed: Nov. 21, 2013

(65) Prior Publication Data

US 2015/0117058 A1    Apr. 30, 2015

(30) Foreign Application Priority Data

Oct. 29, 2013    (TW) .............................. 102139035 A

(51) Int. Cl.
| | |
|---|---|
| *F21V 7/04* | (2006.01) |
| *F21V 8/00* | (2006.01) |
| *F21K 99/00* | (2010.01) |
| *F21V 7/05* | (2006.01) |
| *F21Y 101/02* | (2006.01) |

(52) U.S. Cl.
CPC ............. *G02B 6/0075* (2013.01); *F21K 9/17* (2013.01); *F21V 7/04* (2013.01); *F21V 7/048* (2013.01); *F21V 7/05* (2013.01); *G02B 6/0068* (2013.01); *G02B 6/0073* (2013.01); *F21Y 2101/02* (2013.01)

(58) Field of Classification Search
CPC ...................................................... G02B 6/0068
USPC ........................................................ 362/612
See application file for complete search history.

(56) References Cited

U.S. PATENT DOCUMENTS

| | | | | |
|---|---|---|---|---|
| 2007/0263405 | A1* | 11/2007 | Ng et al. ......................... | 362/555 |
| 2009/0009994 | A1* | 1/2009 | Wu et al. ......................... | 362/230 |
| 2011/0063835 | A1* | 3/2011 | Rivas et al. .................... | 362/235 |

\* cited by examiner

*Primary Examiner* — Anh Mai
*Assistant Examiner* — Hana Featherly
(74) *Attorney, Agent, or Firm* — Novak Druce Connolly Bove + Quigg LLP

(57) ABSTRACT

An LED tube includes an envelope, three light guiding plates received in the envelope, three LEDs mounted on the light guiding plates, and two covers fixed to two opposite ends of the envelope. The three light guiding plates each have an end face confronting a corresponding LED, an inner face having a plurality of dots formed thereon and an outer face opposite to the inner face. Light emitted by each LED is diffused by the dots of a corresponding light guiding plate to radiate outside uniformly.

16 Claims, 6 Drawing Sheets

US 9,213,133 B2

LED TUBE WITH LIGHT GUIDING PLATE ARRANGED IN A TRIANGLE

BACKGROUND

1. Technical Field

The disclosure generally relates to LED (light emitting diode) tubes, and more particularly to an LED tube with light guiding plates.

2. Description of Related Art

Nowadays LEDs (light emitting diodes) are applied widely in various applications for illumination. However, the LED is a highly pointed light source. Thus, when the LEDs are incorporated in a tube for illumination, the light emitted from the LED cannot radiate uniformly, thereby affecting an illumination effect of the tube.

What is needed, therefore, is an LED tube with light guiding plates which can address the limitations described.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the various views.

DETAILED DESCRIPTION

Figure 1:
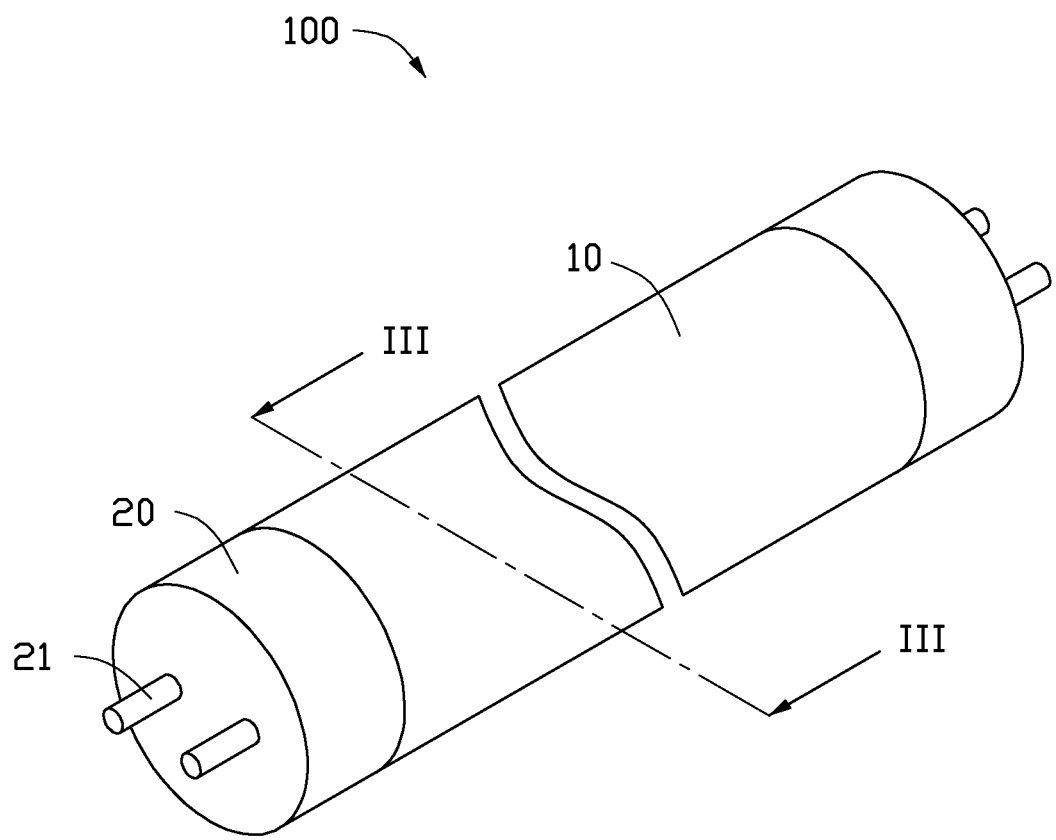
FIG. 1 is an isometric view of an LED tube in accordance with an embodiment of the present disclosure.
Figure 2:
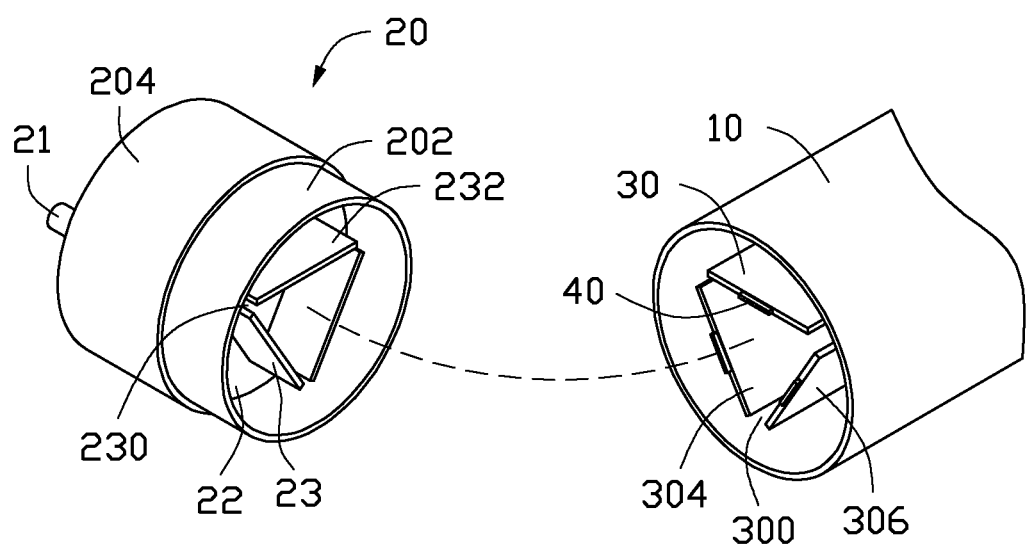
FIG. 2 is an exploded view of a part of the LED tube of FIG. 1.

Referring to FIGS. 1-2, an LED (light emitting diode) tube 100 in accordance with an embodiment of the present disclosure is shown. The LED tube 100 includes an envelope 10, two covers 20 fixed to two opposite ends of the envelope 10, three light guiding plates 30 received in the envelope 10 and a plurality of LEDs 40 mounted on the light guiding plates 30.

The envelope 10 is a hollow tube. The envelope 10 may be made of transparent material such as glass or epoxy. The envelope 10 may be coated with a light diffusion layer on an inner circumferential face thereof. The light diffusion layer can diffuse light passing through the envelope 10, thereby increasing uniformity of the light.

Each cover 20 is fixed to one end of the envelope 10. Each cover 20 has an inner end 202 inserted to the envelope 10 and an outer end 204 exposed out of the envelope 10. The inner end 202 of each cover 20 has an outer diameter slightly less than an inner diameter of the envelope 10. The outer end 204 of each cover 20 has an outer diameter equal to an outer diameter of the envelope 10. Two pins 21 are formed on an outer face of each cover 20. The two pins 21 can be inserted to a general tube socket for supplying power to the LED tube 100. A circuit board 22 is attached on an inner face of one cover 20. The other cover 20 does not have a circuit board 22 attached thereon. The circuit board 22 is electrically connected to the two pins 21. Three supporting plates 23 are formed in each cover 20, wherein in the one cover 20, the three supporting plates 23 are directly connected to the circuit board 22; in the other cover 20, the three supporting plates 23 are directly connected to an inner face of the other cover 20. The three supporting plates 23 of each cover 20 are arranged in a triangle, wherein an angle defined between every two adjacent supporting plates 23 is 120 degrees. The three supporting plates 23 are spaced from each other with a gap 230 defined between every two adjacent supporting plates 23. In other words, the three supporting plates 23 are not in contact with each other. Each supporting plate 23 may be made of opaque material so that the light cannot pass through each supporting plate 23.

Figure 3:
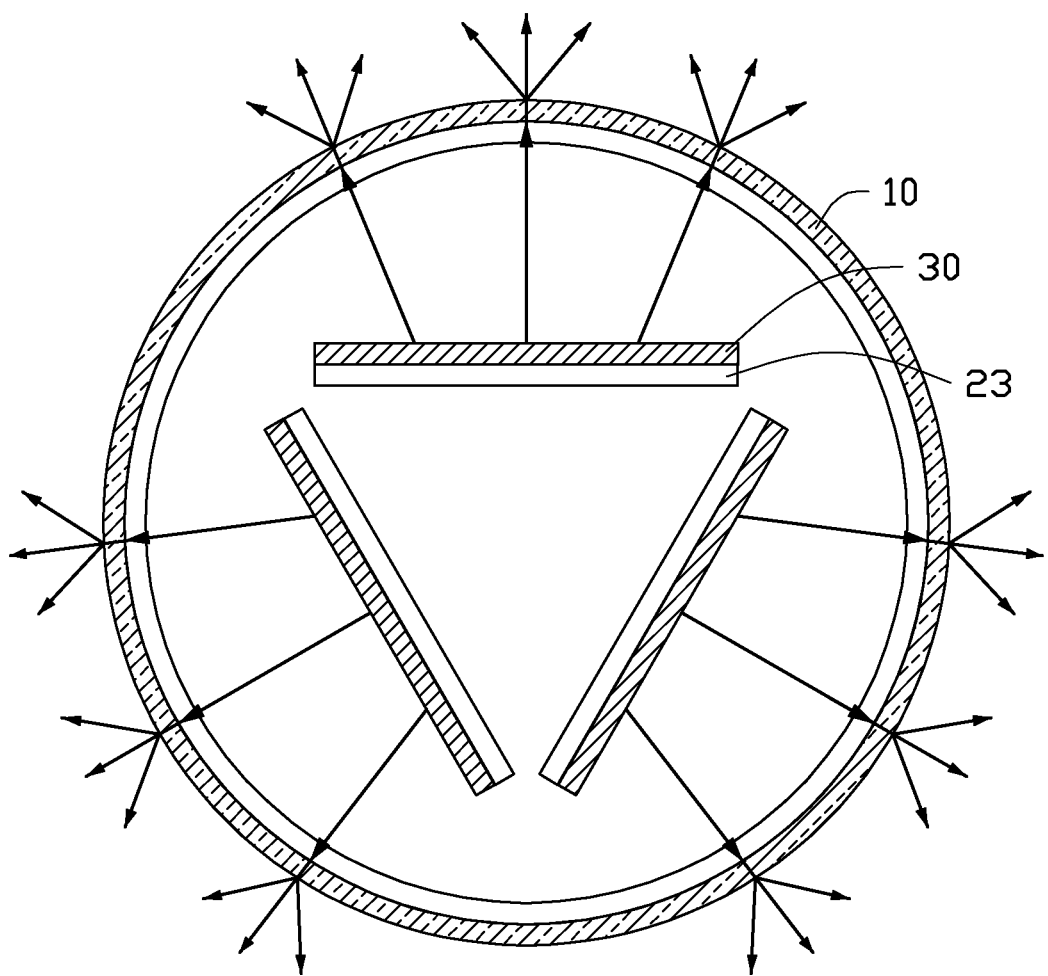
FIG. 3 is a cross section of the LED tube of FIG. 1, taken along line III-III thereof.
Figure 4:
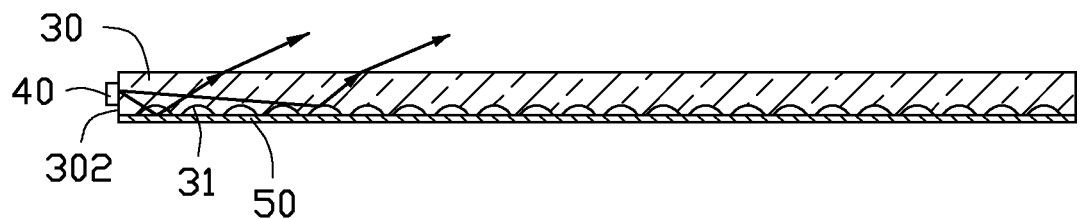
FIG. 4 shows a light guiding plate used with an LED of the LED tube of FIG. 1.

Also referring to FIGS. 3-4, the three light guiding plates 30 are also arranged in a triangle similar to the three supporting plates 23. The three light guiding plates 30 are spaced from each other with a gap 300 defined between every two adjacent light guiding plates 30. Each LED 40 is placed at an end face 302 of a corresponding light guiding plate 30. Each LED 40 is electrically connected to the circuit board 22 so that each LED 40 can be powered by the circuit board 22 to emit light. The light emitted from each LED 40 transmits into a corresponding light guiding plate 30 through the end face 302 thereof. An inner face 304 of each light guiding plate 30 is attached on an outer face 232 of a corresponding supporting plate 30 of each cover 20. Thus, the three light guiding plates 30 are fixed to the two covers 20. Each light guiding plate 30 may be made of transparent material such as epoxy, silicone or the like. Each light guiding plate 30 is elongated along a lengthwise direction of the envelope 10. Each light guiding plate 30 has a length larger than that of each supporting plate 23. Each light guiding plate 30 forms a large amount of dots 31 at the inner face 304 thereof. In this embodiment, the dots 31 are micro holes defined in the inner face 304 of each light guiding plate 30; however, the dots 31 may also be micro protrusions protruding from the inner face 304 of each light guiding plate 30. The dots 31 can reflect and refract the light from the end face 302 towards various directions, thereby scattering the light uniformly. A reflective layer 50 is further formed on the inner face 304 of each light guiding plate 30 to cover the dots 31. The reflective layer 50 can further reflect the light towards the outer face 306 of each light guiding plate 30, thereby increasing light emitting efficiency of the LED tube 100. The reflected and refracted light finally transmits out of the outer face 306 of each light guiding plate 30, and passes through the envelope 10 to illuminate an outside environment of the LED tube 100. Since the dots 31 can scatter the light emitted from the LED 40 uniformly, the light output from the envelope 10 of the LED tube 100 can obtain a favorable illumination effect.

Figure 5:
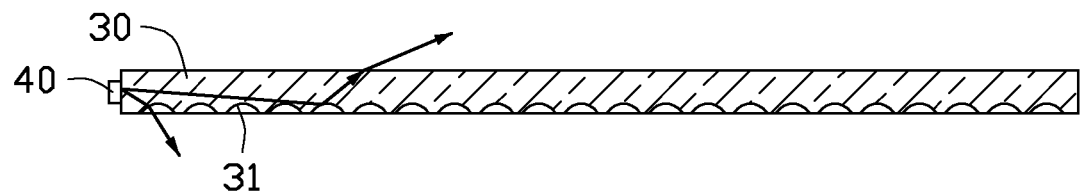
FIG. 5 is similar to FIG. 4, wherein a reflective layer of the light guiding plate of FIG. 4 is removed for clarity.
Figure 6:
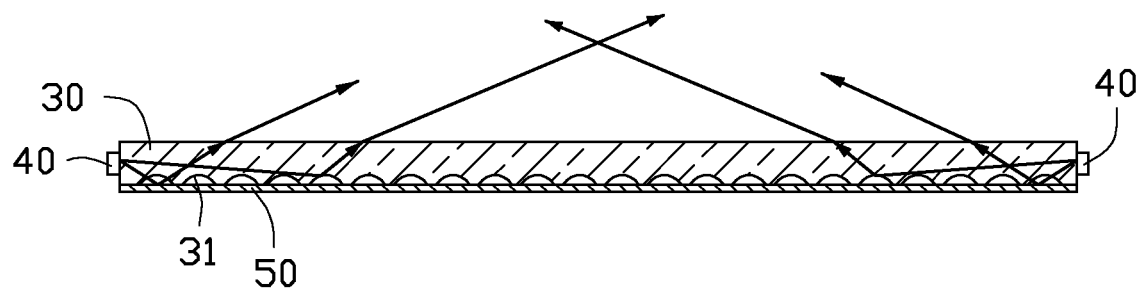
FIG. 6 is similar to FIG. 4, wherein another LED is used with the LED of FIG. 4.

Alternatively, the reflective layer 50 may be omitted from each light guiding plate 30 as shown in FIG. 5. The dots 31 can still provide sufficient light scattering capability by themselves. Furthermore, an opposite end face 302 of each light guiding plate 30 can also have an LED 40 placed thereon as shown in FIG. 6. Thus, both of two opposite ends of each light guiding plate 30 have light incident into each light guiding plate 30, thereby increasing light intensity of the LED tube 100.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An LED (light emitting diode) tube, comprising:
   an envelope;
   a plurality of light guiding plates received in the envelope, and arranged in a triangle, each light guiding plate having a plurality of dots formed at a first face thereof; and
   a plurality of LEDs each facing a second face of a corresponding light guiding plate;
   wherein light emitted from each LED enters a corresponding light guiding plate through the second face, travels in the light guiding plate, and being scattered by the dots to uniformly radiate out of the corresponding light guiding plate and away from the other light guiding plates.

2. The LED tube of claim 1, wherein the first face is located adjacent to the second face.

3. The LED tube of claim 1, wherein the first face has an area larger than that of the second face.

4. The LED tube of claim 1, wherein the dots comprises micro holes defined in the first face.

5. The LED tube of claim 1, wherein the dots comprises micro protrusions protruding from the first face.

6. The LED tube of claim 1, wherein each light guiding plate has a reflective layer formed on the first face and covering the dots.

7. The LED tube of claim 1, wherein the light guiding plates are spaced from each other with a gap defined between every two adjacent light guiding plates.

8. The LED tube of claim 1 further comprising two covers fixed to two opposite ends of the envelope, wherein one of the two covers has a circuit board electrically connected to the LEDs.

9. The LED tube of claim 8, wherein each cover has a plurality of supporting plates, the first face of each light guiding plate being attached on a corresponding supporting plate.

10. The LED tube of claim 9, wherein the light guiding plates are surrounded by the supporting plates of each cover.

11. The LED tube of claim 9, wherein the supporting plates of the one of the two covers are directly connected to the circuit board.

12. The LED tube of claim 9, wherein the supporting plates of each cover are arranged in a triangle.

13. The LED tube of claim 12, wherein the supporting plates of each cover are spaced from each other with a gap defined between every two adjacent supporting plates.

14. The LED tube of claim 9, wherein each supporting plate has a length less than that of each light guiding plate.

15. The LED tube of claim 9, wherein each supporting plate is opaque, and each light guiding plate is transparent.

16. The LED tube of claim 1, wherein the envelope has a light diffusion layer formed on an inner circumferential face thereof.

* * * * *